April 4, 1961    E. GAUDRY    2,978,277
WHEEL ASSEMBLY
Filed April 1, 1958
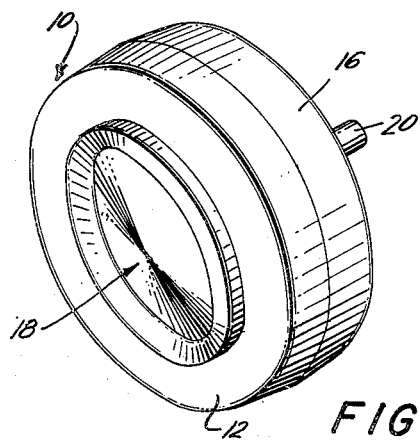
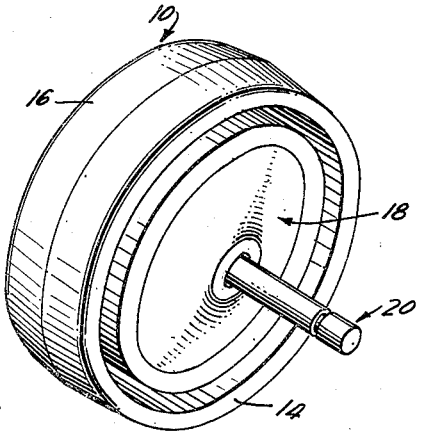
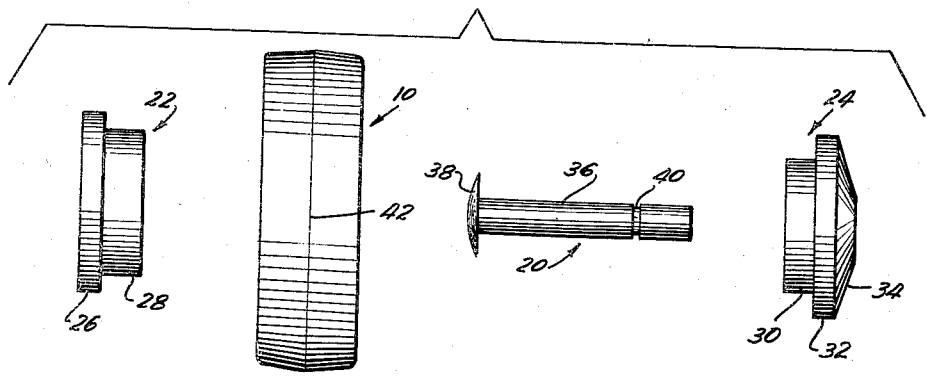
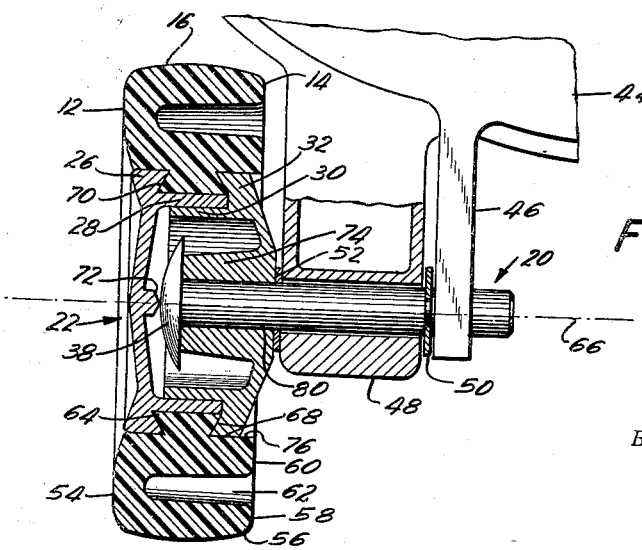
INVENTOR.
Edouard Gaudry
BY
his ATTORNEY

United States Patent Office 2,978,277
Patented Apr. 4, 1961

2,978,277

WHEEL ASSEMBLY

Edouard Gaudry, Montreal, Quebec, Canada, assignor to Aktiebolaget Electrolux, Stockholm, Sweden, a corporation of Sweden Filed Apr. 1, 1958, Ser. No. 725,735

2 Claims. (Cl. 301—111)

This invention relates to wheel assemblies and to assembly components.

Wheel assemblies are known in each of which a wheel is supported on a hub which accommodates an axle supported in a journal or bearing. These assemblies usually involve complex assembly techniques and devices and it is an object of the invention to avoid such complexities. A further object of the invention is to provide for easily manufactured components which are readily combined as complete wheel assemblies and to achieve this improvement without sacrificing optimum performance and reliability.

In achieving the above and other of its objectives, the invention contemplates the provision of readily fabricated parts which are frictionally engageable and which are so shaped as to prevent undesirable relative movements of the parts while providing, at the same time, for all of the necessary movements.

The invention will next be explained in greater detail with reference to a preferred embodiment thereof as illustrated in the accompanying drawing in which:

Figure 1 is a perspective view of a wheel assembly provided in accordance with the invention showing one side thereof;

Figure 2 is a perspective view of the other side of the wheel assembly shown in Figure 2;

Figure 3 is an exploded view of the wheel assembly of Figures 1 and 2 illustrating the various components of the assembly; and Figure 4 is a partly sectional view of the wheel assembly mounted in a journal.

The wheel assembly shown in perspective in Figures 1 and 2 comprises a wheel 10 having two laterally opposite faces 12 and 14 and a rolling surface 16. Centrally located in the wheel 10 is a hub 18 which rotatably accommodates an axle 20.

The components of the wheel assembly are more clearly shown in Figure 3, wherein the wheel 10, the hub 18, and the axle 20 are illustrated in disassembled condition, it being noted that the hub 18 comprises two separate sections 22 and 24.

The section 22 of hub 18 comprises two circular portions of different diameter, the section 26 having a greater diameter than the section 28 and these two sections being integrally fabricated from a single metallic piece.

The section 24 similarly consists of two circular portions 30 and 32, the diameter of the circular portion 30 being less than the diameter of the circular portion 32 to which is affixed a conical outer portion 34.

The axle member 20 consists simply of a rod or shaft 36 at one end of which is affixed a spherical head or enlarged portion 38. An external groove 40 may be provided for the locking of the axle 20 in a journal as will hereinafter be described. The axle member 20 is preferably of metal.

The wheel 10 whose circular configuration is illustrated by the shading lines in Figure 3 is preferably a molded part made of a resilient material like polyethylene, for example. A seam line 42 is illustrative of the molding operation. Although the wheel 10 can be made of many different materials, it is preferred that the material from which the wheel is made have a restricted resiliency and that the same be somewhat yieldable for purposes which hereinafter will be described.

In Figure 4 is illustrated a chassis 44 of a household vacuum cleaner or like mechanism which is to be made mobile by the use of a wheel assembly provided for in accordance with the invention. To the chassis or frame 44 is affixed a depending flange 46 and a journal or bearing 48, these two latter members cooperatively and rotatably supporting the axle 20. A lock washer 50 can be provided for engaging the groove 40 on the axle 20 for restricting an axial displacement of the axle and a washer 52 can be provided intermediate the journal 48 and the hub 18 as is conventional.

In Figure 4 it will be noted that the lateral faces 12 and 14 as well as the rolling surface 16 of the wheel 10 are defined by a lateral wall 54 and an axially extending peripheral flange 56 on the wall 54. The lateral wall 54 defines the lateral face 12, the outer surface of the flange 56 defines the rolling surface 16 and the end 58 of the flange 56 defines, at least in part, the lateral face 14 of the wheel 10.

It will furthermore be noted in Figure 4 that the cross-section of the wheel 10 is further constituted by an inner flange 60 which cooperatively defines with the flange 56 an annular groove 62. The flanges 56 and 60 are annular parallel flanges whose resilience or yieldability is enhanced by provision of the groove 62 which extends at least half way through wheel 10 in an axial direction.

The cross-section of the wheel 10 furthermore illustrates that there is provided on the flange 60 a further flange 64 which is directed inwardly of the wheel towards its axis of rotation 66. The cross-section of the flange 64 which is centrally located in the wheel 10 is trapezoidal so as to define with the flange 60 acute angles such as indicated by the acute angle 68.

The configurations and the purposes of the different portions of sections 22 and 24 of the hub 18 are more clearly apparent from the sectional views thereof. In this regard, it will be noted that the portion 28 is a ring or annular flange extending inwardly of the circular portion 26, the portions 26 and 28 defining an annular groove 70, the cross-section of which is that of an acute angle which is adapted to accommodate one extremity of the flange 64.

Similarly, the portion 30 of the section 24 of the hub 18 is a ring shaped member extending perpendicularly of the portion 32 to which it is connected. As noted above, with respect to portions 26 and 28, the portions 30 and 32 define an annular groove having a cross-section defining an acute angle which accommodates the other extremity of the flange 64.

The respective diameters of the portions 28 and 30 are such that the member 30 can be accommodated within the portion 28 in a mating frictional engagement. With the portions 28 and 30 so engaged, the portion 28 is in abutting relationship with the portion 32 of section 24.

Portion 26 of the hub, centrally supports an end thrust bearing 72, whereas the portion 32 of hub 18 centrally supports a hub member 74. The latter member 74 defines a bore which is axially disposed relative to the wheel 10 and the end thrust bearing 72 tapers substantially to a point which is axially disposed.

The abutting relationship of the portion 28 with respect to the portion 32 with the portions 28 and 30 in mating engagement is such that the end thrust bearing 72 and the hub member 74 delimit an axially extending space therebetween. In this space is accommodated the head 38 of the axle 20 whereby this head is prevented from being axially displaced so that the wheel 10 and the axle 20 have substantially fixed relative axial positions.

The wheel 10 as has probably already been noted defines a central circular opening 76 in which is engaged the hub 18. The diameters of the central opening 76 which provide for accommodating the sections 22 and 24 of the hub 18 are slightly smaller than the corresponding diameters of the circular portions 26 and 32 of these sections. Thus, by virtue of the resilient nature of the wheel 10 and the diameters mentioned above, provision is made for a snap engagement or friction fit between the various parts.

For assembly purposes, the section 22 of the hub 18 is pressed into the central opening 76 of the wheel 10 at the lateral face 12 thereof, the flange 64 being engaged at one lateral extremity in portion 70 of the associated hub section. The axle 20 is inserted through the axial hole 80 in the hub section 24 and the hub section 24 is inserted into the central opening 76 of the wheel 10 at the lateral face 14 thereof. The head 38 of the axle 20 is thus snugly accommodated between the end thrust bearing 72 and the hub member 74 and the wheel assembly is complete with the free end of the axle 20 being adapted for accommodation in the journal 48 and locked into position in this journal by means of the washer 50.

The wheel assembly thus provided is constituted by components which are remarkably easy to manufacture. These components are readily assembled into an integral assembly which enables all desired movements of the different components while restricting and preventing undesirable movements of the same. The annular groove 62 provided in the wheel 10 adapts the flange 56 to a degree of yieldability whereby this flange is readily displaced to cushion shock and the groove 62 moreover enhances the yieldability of the flange 60 to provide for the ready accommodation of the hub 18. By providing a wheel assembly like that illustrated and just described in which the wheel 10 is formed of a plastic material like polyethylene, for example, a wheel is provided having sufficient resiliency so that it will not roll hard or rumble on a bare floor.

There will now be obvious to those skilled in the art many modifications and variations of the structure set forth which do not depart essentially from the spirit of the invention as defined in the following claims.

What is claimed is:

1. A wheel assembly comprising a wheel member defining a central opening and having an axis of rotation, hub sections engaged frictionally in the opening on opposite sides of the wheel member, said sections cooperatively defining an inner chamber, a hub member on one of said sections and extending in said chamber towards the other of said sections, an end thrust bearing on said other section in said chamber, said bearing extending towards but being spaced from said hub member, said hub member being provided with a more centered on said axis of rotation, an axle extending through said bore, and an enlarged portion integral with said axle at the end of the latter and freely rotatable in said chamber, said enlarged portion being engaged between said hub member and bearing and being in contact therewith so that relative axial movement of said wheel member and axle is prevented, said end thrust bearing tapering substantially to a point on said axis, said enlarged portion having a spherical surface in engagement with said bearing at said point.

2. An assembly as claimed in claim 1, wherein one of said hub sections includes an annular flange extending axially towards and being in abutting relationship with the other of said hub sections.

References Cited in the file of this patent

UNITED STATES PATENTS

| | | |
|---|---|---|
| 826,622 | Swinehart | July 24, 1906 |
| 1,468,768 | Vogel | Sept. 25, 1923 |
| 2,572,835 | Bloom | Oct. 30, 1951 |
| 2,634,168 | Maxam | Apr. 7, 1953 |
| 2,717,807 | Kapp | Sept. 13, 1955 |
| 2,723,162 | Gross | Nov. 8, 1955 |
| 2,863,701 | Jones | Dec. 9, 1958 |

UNITED STATES PATENT OFFICE
CERTIFICATE OF CORRECTION

Patent No. 2,978,277                          April 4, 1961

Edouard Gaudry

It is hereby certified that error appears in the above numbered patent requiring correction and that the said Letters Patent should read as corrected below.

Column 4, line 17, for "more" read -- bore --.

Signed and sealed this 26th day of September 1961.

(SEAL)
Attest:

ERNEST W. SWIDER                          DAVID L. LADD
Attesting Officer                            Commissioner of Patents

USCOMM-DC